May 21, 1968    C. E. GILLET    3,383,906
BENCH FOR PNEUMATICALLY TESTING THE IMPERMEABILITY OF TUBES
Filed July 25, 1966    2 Sheets-Sheet 1
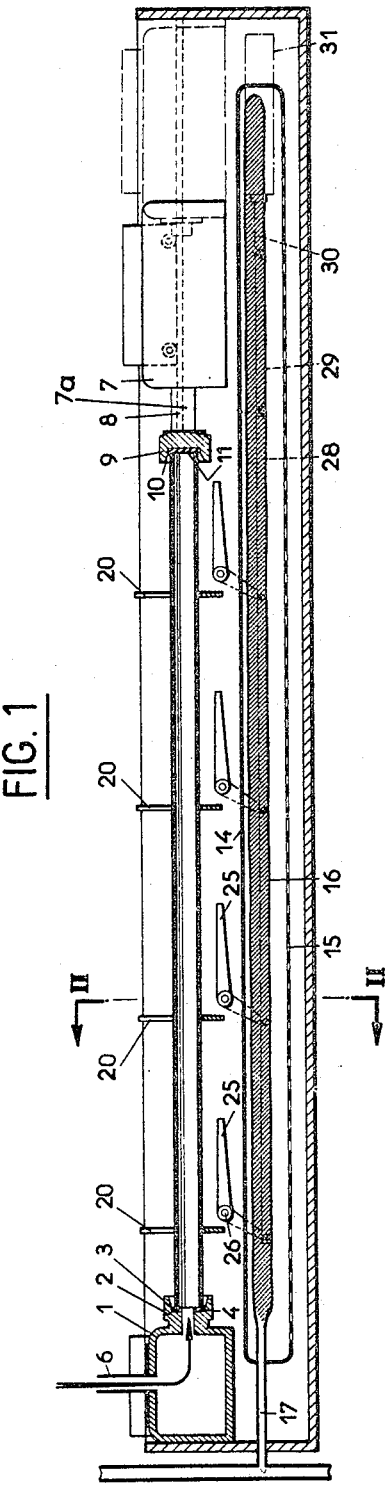
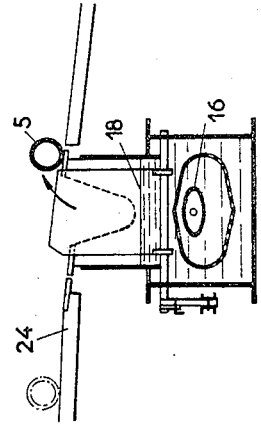
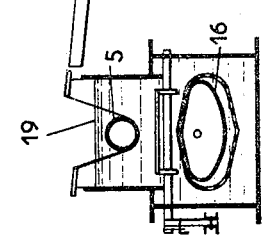
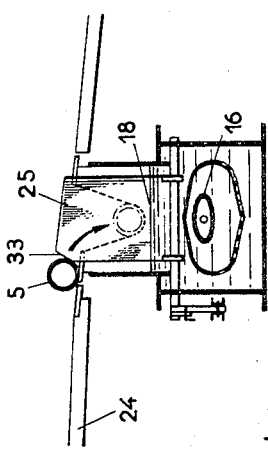
Inventor
C. E. GILLET
By Holcombe, Wetherill & Bricebois
Attorneys May 21, 1968   C. E. GILLET   3,383,906
BENCH FOR PNEUMATICALLY TESTING THE IMPERMEABILITY OF TUBES
Filed July 25, 1966   2 Sheets-Sheet 2

Inventor
C. E. GILLET
By Holcombe, Wetherill & Brisebois
Attorneys

United States Patent Office 3,383,906
Patented May 21, 1968

3,383,906
BENCH FOR PNEUMATICALLY TESTING THE IMPERMEABILITY OF TUBES
Charles Eugene Gillet, Paris, France, assignor to Societe Anonyme dite: Vallourec, Paris, France
Filed July 25, 1966, Ser. No. 567,751
6 Claims. (Cl. 73—45.5)

ABSTRACT OF THE DISCLOSURE

A tank containing water for testing the impermeability of tubes comprising means for closing the ends of tubes introduced into said tank, an expansible bladder for raising the level of the water to cover the tubes, and a rigid container enclosing the bladder. Only the lower surface of said container is perforate.

---

In order to test the impermeability of tubes, and particularly of welded tubes, it is common to use a testing bench equipped with means for closing off each end of the tube and for introducing compressed air into the tube, which is immersed in a tank full of water. The test is carried out by simply looking to see if any bubbles are released from the tube. Naturally, the tube cannot be immersed until after its ends have been closed off, and the tube is usually immersed by raising the level of the liquid in the tank.

The principal difficulty results from the fact that, while this level is being raised, the surface of the water is rendered turbulent and this prevents seeing the tube clearly. It is therefore necessary to wait a little while until the water calms down before it is possible to proceed, and the impermeability tests cannot therefore be carried out in rapid succession.

It is the object of the present invention to provide a new article of manufacture which consists of a testing bench comprising a water tank, the lower part of which is provided over substantially its entire length with a rigid container having a foraminous lower wall, a bladder made of rubber or some other flexible material inside the container, and a passage through which compressed air may be injected into the bladder so as to raise the level of the liquid in the tank.

In an improved embodiment of the invention, this testing bench is provided with automatic means for introducing and removing the tubes. This automatic means comprises:

(a) A series of single or multiple fixed V-shaped supports within which one or more tubes may be positioned in the direction of the longitudinal axis of the testing bench. Each of these supports is provided with an inclined surface for supply and withdrawing tubes, the latter being positioned at a level slightly higher than the former.

(b) A series of movable flaps positioned between the fixed supports, the uppermost parts of which, when in their raised position provide both a stop for the tubes on the input side of the device and an inclined surface which prolongs the inclined plane of the fixed supports over which the tubes are withdrawn.

In order that the invention may be clearly understood, one embodiment thereof will now be described, purely by way of example with reference to the accompanying drawings, in which:

FIGURE 1 is a vertical, longitudinal section taken through the middle of the testing bench;

Figure 3:
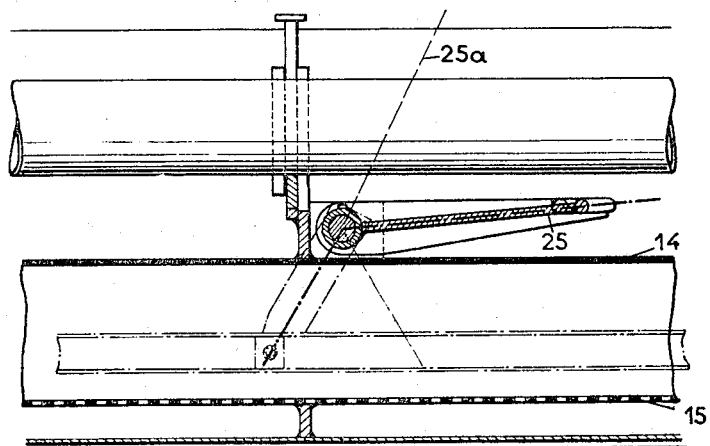
FIGURE 3 is a sectional view taken along the line III—III of FIG. 2.
Figure 7:
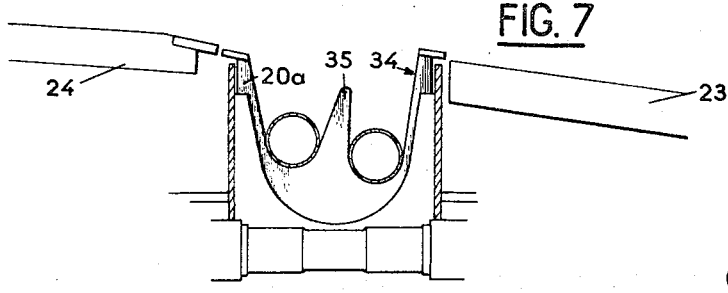

FIGURES 4, 5, and 6 are transverse sectional views in the plane of FIG. 3, illustrating the successive steps in the cycle of operations of the automatic tube introducing and removing means; and FIGURE 7 is a schematic view showing an alternative construction of the fixed supports, which makes it possible to test two tubes at a time.

The testing bench shown on FIG. 1 comprises, as is conventional, tube sealing means at each end. The first of these tube sealing means, designated by reference numeral 1, comprises a mouthpiece 2 provided with a centering cone 3 and a sealing ring 4 which bears against the end of the tube 5 which is to be tested. It is provided with a pipe 6 which may be connected, if so desired, to a source of compressed air. The device 1 may be movable as a unit, but in the simplest type of bench it is merely fixed to the end of the tank.

Figure 2:
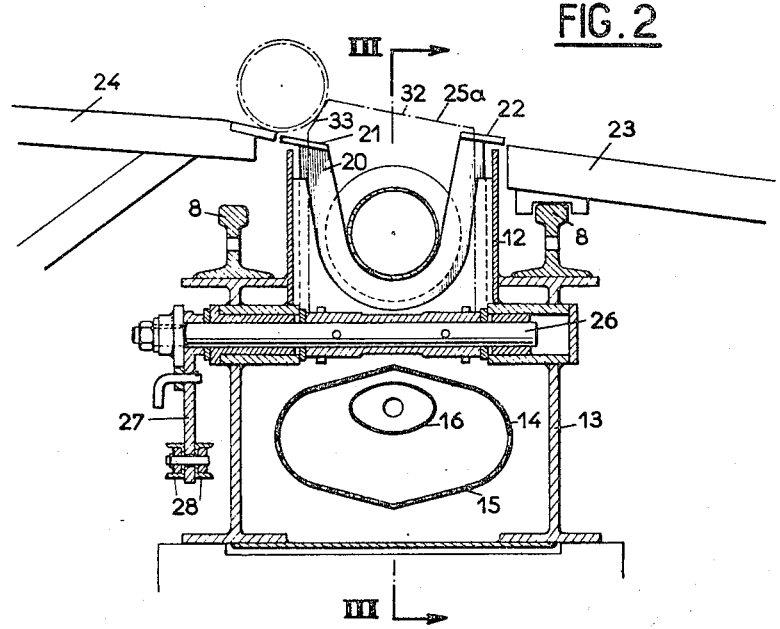
FIGURE 2 is a transverse sectional view taken along the line II—II of FIG. 1.

The second tube sealing means, 7, is movably mounted on rails 8 (FIG. 2) along which it may occupy any of a plurality of diverse positions along the length of the tube 5. The device 7 also comprises an actuating cylinder, usually operated by compressed air, the piston rod of which moves longitudinally of the bench. This rod terminates in a device 9 analagous to the tube sealing device 2, that is to say, also comprising a centering cone 10 and a sealing ring 11, but without any axial air passage. By actuating the cylinder, the tube 5 is gripped between the two mouthpieces 2 and 9, thus simultaneously sealing both ends of the tube.

The assembly is mounted in a water tank comprising a rectangular upper part 12 and a larger lower part 13. The walls of the tank serve as the sides of the testing bench.

In the bottom of the tank, inside the part 13, is a container 14, the vertical section of which may be as shown in the drawings, and having a length substantially equal to that of the tank. This container is preferably wider than it is tall. The lower wall of the container 14, is pierced by a large number of perforations 15 through which the liquid may flow. Finally, inside the container 14 is a rubber bladder 16, extending the length of the container, and connected in a fluid-tight manner by a pipe 17 to the open air, or to a source of compressed air.

When the pipe 17 is connected to the open air, the tank is filled to the level 18 as shown in FIGURE 4. Under these conditions, the hydrostatic pressure of the water on the bladder flattens it, so that it is completely emptied through the tube 17. If compressed air is then introduced through the tube 17 into the bladder 16, the bladder is inflated so as to completely fill the container 14, and drives the water out through the perforations 15, so that the water in the part 12 of the tank rises to a level 19 (FIG. 5), which completely immerses the tube 5. After completion of the test, the air in the bladder is released through the tube 17 so that the level of the liquid returns to the level 18.

The movement of the liquid level between 18 and 19 is in a completely consistent manner, and, because the perforations 15 are evenly distributed over the entire length of the tank, these changes in level take place without causing turbulence in the liquid, since the movement of the liquid is almost entirely vertical.

In order to increase the number of tubes which may be tested per hour, an automatic device may be provided for introducing and withdrawing the tubes. This device comprises first a series of fixed supports 20 spaced along the length of the bench. These supports are V-shaped, with their bottoms rounded to conform to the shape of the tubes while centering them relative to the axes of the mouthpieces 2 and 9. The upper parts of these supports each terminate at one side in a plane surface which is inclined in the direction required to guide the tubes onto the support and, at the other side in a plane surface 22 inclined to guide the tubes away therefrom.

The plane surfaces 22 are prolonged by plane surfaces 23 guiding the tubes away from the tank, and the plane surfaces 21 are supplied by the inclined surfaces 24 fed by a tube distributor not shown, and mounted on movable gates which admit an operator to check the fluid-tightness of the tubes.

The device also comprises a series of flaps 25 which are movable about a horizontal axle 26 and positioned as shown in the figures, each axle being turned by a crank 27, and the ends of all of the cranks being pivotally connected to a common rod 28 connected by a connecting rod 29 to the piston rod 30 of a cylinder 31 which makes it possible to simultaneously actuate all the flaps 25. In a first position, shown on FIGS. 1, 3 and 5, these flaps are substantially horizontal in their rest position. In another position, produced by action of the cylinder 31, these flaps are retracted into the position shown in dotted lines on FIGS. 2 and 3 designated by 25a.

It will be seen from the figures that the upper part of these flaps is in the form of a sloping surface 32 which when in raised position effectively prolongs the inclined surfaces 22 and 23, or is positioned slightly thereabove, and is provided with a steep slope 33 which stops any tube arriving along the inclined surface 21.

When the flaps 25 are lowered, this tube rolls into the slope 32 and passes without any drop onto the supports 20. The cycle of operations is then as follows:

The gates 24 having been put in place, and the distributor (not shown) having deposited a tube on these gates, the tube comes to rest against the abutment 33 on each of the gates 25, raised as shown in FIG. 4, the bladder being then deflated.

The flaps 25 are then lowered by the cylinder 31, the tube is centered and fastened on the bench by the cylinder 7, compressed air is admitted into the pipe 6, the liquid level is raised by the resulting inflation of the bladder 16 as shown in FIG. 5, the gates being then opened to permit the operator to pass through.

Once the inspection has been completed, the pipe 17 is connected to the open air, thus permitting the liquid level to descend, the tube is connected to the open air through the pipe 6 and the cylinder 7 withdraws its rod. The flaps 25 are then raised by the cylinder 31. This produces, as schematically shown on FIG. 6, the removal of the tube 5 and at the same time places the flaps in a position to stop the next tube, shown in dotted lines, when it arrives over the gates 24, now returned to their normal positions.

The successive feeding of all these pipes and cylinders may naturally be automatically brought about, if that is desired.

In an alternative form of the invention, illustrated on FIG. 7, the supports 20 are replaced by supports 20a adapted to receive two tubes simultaneously, these tubes being nevertheless automatically introduced and withdrawn by the same flaps 25. In fact, if the tube distributor supplies two tubes each time it is operated, they will come to a stop, one after the other, against the abutment 33 of each of the flaps. When the flaps begin to descend, the tubes roll onto the inclined surfaces 32 until the first tube encounters the surface 34 inside and to the right of each support 20a. The flaps continue their descent and the two tubes fall side by side at the same time. The point 35 carried by each of the supports 20a then enters between the two tubes and guides each to its proper place. Two mouthpieces are of course provided at each end and positioned to cooperate with the tubes on the supports 20a. Subsequent lifting of the flaps 25 withdraws the tubes, which then roll away over the inclined surfaces 32.

It will of course be appreciated that this embodiment of the invention has been described purely by way of example, and may be modified as to detail without thereby departing from the basic principles of the invention.

What I claim is:

1. Apparatus for testing the impermeability of tubes, said apparatus comprising a tank for holding a liquid, means in the upper part of said tank for sealingly contacting the ends of a tube introduced into said tank, means for introducing a gas into said tube through said contacting means, an inflatable bladder in the lower part of said tank, means for introducing a gas into and permitting egress of said gas from said bladder, thereby raising and lowering the level of the liquid to cover and uncover a tube contacted by said tube contacting means, and a rigid container enclosing said bladder and having a volume at least as great as the maximum desired volume of said bladder, said container being provided with a substantially impervious upper wall and a foraminous lower wall.

2. Apparatus as claimed in claim 1 comprising a plurality of supports provided with upwardly opening recesses and positioned in said tank with said recesses in alignment with each other and said tube contacting means so as to support in said recesses a tube with its ends in contact with said tube contacting means.

3. Apparatus as claimed in claim 2 comprising a first sloping surface leading downwardly toward one side of said supports and a second sloping surface sloping downwardly away from the other side thereof.

4. Apparatus as claimed in claim 3 in which the edge of said second sloping surface nearest said supports is higher than the edge of the first sloping surface nearest said supports.

5. Apparatus as claimed in claim 4 comprising movable abutment means between said supports, said abutment means being movable between an upper position blocking access to said recesses by any tube approaching along said first sloping surface and a lower position clear of said recesses, said abutment means being provided with an upper surface which slopes downwardly toward said second sloping surface when said abutment means is in its upper position.

6. Apparatus as claimed in claim 1 in which said tube contacting means comprises stationary means sealing against one end of a tube, and movable means sealing against the other, said gas introducing means being connected to said stationary means.

References Cited

UNITED STATES PATENTS

| 1,101,932 | 6/1914 | Hooker et al. | 73—45.5 |
| 2,986,029 | 5/1961 | Musial | 73—49.1 |

DAVID SCHONBERG, *Primary Examiner.*

LOUIS R. PRINCE, *Examiner.*

J. NOLTON, *Assistant Examiner.*